(12) United States Patent
Kerrien et al.

(10) Patent No.: US 6,714,668 B1
(45) Date of Patent: Mar. 30, 2004

(54) METHOD OF AUTOMATIC REGISTRATION OF IMAGES

(75) Inventors: Erwan Kerrien, Nancy (FR); Eric Maurincomme, Chevruse (FR); Laurent Launay, St. Remy les Chevruse (FR); Régis Vaillant, Villegon sur Yvette (FR)

(73) Assignee: GE Medical Systems SA, Buc (FR)

( * ) Notice: Subject to any disclaimer, the term of this patent is extended or adjusted under 35 U.S.C. 154(b) by 623 days.

(21) Appl. No.: 09/651,035

(22) Filed: Aug. 30, 2000

(30) Foreign Application Priority Data

Aug. 30, 1999 (FR) .............................. 99 10906

(51) Int. Cl.$^7$ .................................. G06K 9/00
(52) U.S. Cl. ...................................... 382/130
(58) Field of Search ...................... 382/128, 130–134

(56) References Cited

U.S. PATENT DOCUMENTS 6,493,415 B1 * 12/2002 Arai et al. ...................... 378/4

OTHER PUBLICATIONS

Kerrien et al., "Machine Precision Assessment for 2D–3D Digital Subtracted Angiographic Images Registration", Proc. SPIE. Conference on Image–Processing, Feb. 1998, V. 3338, pp 39–49, San Diego, CA.

Feldmar, J et al, "3D–2D Projective Registration of Free-Form Curves and Surfaces", Computer Vision and Image Understanding, US, Academic Press, V. 65, No. 3, Mar. 1, 1997, pp403–424.

Kerrien et al, "Fully Automatic 3D/2D Subtracted AnGiography Registration", Cars'99, Proceedings of the 13th International Congress and Exhibition, Paris Jun. 23–26, 1999.

Launay, "Localization and 3D Reconstruction From Stereotaxic Angiograms" Doctoral Thesis, National Polytechnic Institute of Loranne, Nancy, France 1996.

* cited by examiner

*Primary Examiner*—Leo Boudreau
*Assistant Examiner*—Tom Y. Lu
(74) *Attorney, Agent, or Firm*—Jay L. Chaskin; Cantor Colburn LLP

(57) ABSTRACT

Method of automatic registration of two- and three-dimensional angiography images by comparison of a two-dimensional digital subtracted angiography image with data on a three-dimensional image reconstructed from rotational angiography sequences, in which a field of distortions in the image is estimated, a conical projection matrix is estimated and an approximation is made of a rigid transformation in space equal to the difference between an initial registration based on the field of distortions and on the conical projection matrix and a perfect registration.

19 Claims, No Drawings

METHOD OF AUTOMATIC REGISTRATION OF IMAGES

BACKGROUND OF THE INVENTION

The present invention concerns the field of image processing, particularly of two- and three-dimensional radiological images.

As is known, radiological apparatuses comprise a means of emission such as an X-ray tube and a means of reception of the emission, such as a solid state detector or even a scintillator and a video camera, of CCD type, for example.

The means of emission and the means of reception of X-rays are generally supported by a mobile system with one or more axes, making it possible to take pictures at different angles of incidence. The means of reception is connected to image processing means making possible the generation of three-dimensional images from a series of two-dimensional images picked up by the means of reception.

It is important to obtain a good match between a three-dimensional image and a two-dimensional image taken upon a stage in which the patient undergoes a particular procedure such as placement of a catheter in the field of angiography, in order to be able to follow the movement of the catheter in the two-dimensional image, but also in the three-dimensional image.

A method of automatic registration of subtracted angiography images is known from the article "Fully automatic 3D/2D Subtracted Angiography Registration" by KERRIEN, LAUNAY, BERGER, MAURINCOMME, VAILLANT and PICARD, published in CARS'99, Proceedings of the 13$^{th}$ International Congress and Exhibition, Paris, Jun. 23–26, 1999. This article indicates that reconstructed three-dimensional images of cerebral vascularization can be obtained from a large number of subtracted angiography images and that in interventional neurology it is worthwhile to register the three-dimensional volume reconstructed on the instantaneous two-dimensional images.

In interventional radiology, it is desirable for the practitioner to be able to know at any time that the catheter is in the patient's body with the utmost possible precision. The practitioner can at the present time deduce this information from digital subtracted angiography images called DSA, which he associates with preoperative magnetic resonance thanks to his anatomical knowledge. DSA images offer, among other things, real time imaging with very high space resolution. Three-dimensional reconstructions of blood vessels called "3DXA" have also been used recently from rotational angiography sequences made by rapid rotation of the X-ray tube and of the camera over half a turn and the taking of about fifty DSA images, which are the projections on input of a tomography algorithm producing the 3DXA image on output. For more information on this technique, the reader is invited to refer to the thesis of LAUNAY, "Localization and 3D reconstruction from stereotaxic angiograms," doctoral thesis, National Polytechnic Institute of Lorraine, Nancy, France, 1996.

These reconstructions make possible a very good appreciation of angioarchitecture. Furthermore, those three-dimensional images can be used in real time according to several types of visualization, such as maximum intensity projection, isosurface, volume melting, virtual endoscopy or even reformatted cross-section, and are a further assist to the diagnoses of practitioners.

SUMMARY OF THE INVENTION

The present invention concerns an improved method of registration.

The present invention also concerns a method of registration of millimetric or submillimetric precision at short calculation time.

The method of automatic registration is intended for two- and three-dimensional angiography images by comparison of a two-dimensional digital subtracted angiography image with data on a three-dimensional image reconstructed from rotational angiography sequences, in which a field of distortions in the image is estimated, a conical projection matrix is estimated and an approximation is made of a rigid transformation in space equal to the difference between an initial registration based on the field of distortions and on the conical projection matrix and a perfect registration. With the rigid transformation comprising a translation part and a rotation part, an approximation is made of the translation part by considering the rotation part as known, the optimal transformation being attained when the correlation of the digital subtracted angiography image and the reconstructed three-dimensional image data is at a maximum.

It is assumed preferably that the residual registration error is due to an error of positioning on translation and rotation of the reconstructed three-dimensional image in the mark of an imaging means.

Preferably, the difference between the reconstructed three-dimensional image data and the two-dimensional digital subtracted angiography image is considered due to a slight displacement following a rigid transformation, the rigid transformation being determined by a modified optical flux technique.

The reconstructed three-dimensional image data preferably relate to a two-dimensional image obtained by conical projection of maximum intensity of the reconstructed three-dimensional image. This type of projection links a single voxel to each pixel. The depth of the voxel chosen as value of one of the space coordinates at a given instant can be used for each pixel on projection.

Advantageously, on each displacement of the digital subtracted angiography image, the new two-dimensional image is calculated from the old two-dimensional image, without new calculation of projection of the reconstructed three-dimensional image. The duration of calculation necessary is considerably reduced from several hours to one or two minutes.

In an embodiment of the invention, the initial registration is given by a marker unit of known three-dimensional position.

In another embodiment of the invention, the initial registration is given by calibration of the angiography machine.

Thus, starting from an initial registration, the initial error in translation is reduced by maximization of the correlation between the digital subtracted angiography image and the reconstructed three-dimensional image data, and by refinement of registration by a modified optical flux technique, it is possible to obtain a registration of millimetric or inframillimetric precision perfectly sufficient for real use in the course of an operation, notably, of interventional neurosurgery or radiology, at the end of a calculation time limited to a few minutes, and even to a few tens of seconds.

The invention applies, in particular, to radiology with three-dimensional images in which the blood vessels are visible. The informational content of such images is slight.

DETAILED DESCRIPTION OF THE INVENTION

The present invention will be better understood by studying the detailed description of an embodiment given by way of nonlimitative example.

The invention makes possible a matching of DSA images and 3DXA images.

"DSA image" means here the image of maximum opacification up to row N in the acquired sequence, that is, each pixel of the resultant image takes the smallest value encountered on the N first images of the sequence, or the image of row N in the acquired sequence. Row N of the image is either chosen by the user or fixed in relation to the rate of acquisition.

Furthermore, the 3DXA volume is projected in view called conical "MIP" (maximum intensity projection). Each voxel of the 3DXA volume can be considered a sphere of radius equal to the size of the voxel, and is projected in the image plane. The final value of each pixel is the maximum value projected in that place. The image thus obtained is described as the "MIP image." As a variant, it is possible to use a conical projection by addition of the values of voxels in each pixel.

Registration between the two image is made by estimate of a field of distortions of the image, a technique known from the article "Machine precision assessment for 3D/2D digital subtracted angiography images registration" by KERRIEN, VAILLANT, LAUNAY, BERGER, MAURIN-COMME and PICARD, in SPIE Medical Imaging, Volume 3338, pages 39–49, 1998.

After estimate of the field of distortions in the image, an estimate is made of a conical projection matrix. A calibration makes it possible to find out the intrinsic parameters of this matrix, the extrinsic parameters being determined as explained below.

The radiology machine, once calibrated, supplies an initial registration which differs from the registration sought of perfect registration by a rigid transformation (rotation +translation) in three-dimensional space. The rigid transformation possesses a rotation part of low amplitude, while the translation part can be considered unknown.

Initially, the translation part is found by considering the rotation part of the projection matrix perfectly known. The optimal position is reached when the centered standardized correlation of the DSA image with the MIP image is maximal. It is assumed that the residual registration error is due to a slight positioning error in both rotation and translation of the 3DXA volume in the camera mark corresponding to the registration obtained. The MIP image is then considered taken at a time $t_1$, since the 3DXA volume moves according to a, slight rigid transformation. An image is acquired at time $t_2$ and the DSA image is obtained. The apparent movement observed between the present MIP image and the DSA image gives information concerning the slight rigid. transformation sought. This information is extracted by a modified optical flux technique.

The centered standardize correlation between the DSA image $I_d$, and the MIP image, $I_m$, is defined by:

$$\gamma = \frac{\sum_{(x,y) \in D} (I_d(x, y) - \hat{I}_d)(I_m(x, y) - \hat{I}_d)}{\sqrt{\sum_{(x,y) \in D} (I_d(x, y) - \hat{I}_d)^2 \sum_{(x,y) \in D} (I_m(x, y) - \hat{I}_m)^2}} \tag{0}$$

where D is the domain common to both images and $\hat{I}_d$, $\hat{I}_m$ are the means of images $I_d$ and $I_m$ respectfully. The current registration is then considered given by the projection matrix M. A new projection matrix M' is sought, which differs from M by the translation $D=(D_x, D_y, D_z)$. Considering a point P which is projected in the coordinate locus (u, v) in the initial image obtained by projection of the volume according to the matrix M and in the coordinate locus (u', v') in the final image obtained after translation, we then have:

$$M'P = \begin{pmatrix} s'u' \\ s'v' \\ s' \end{pmatrix} = MP + \vec{D} = \begin{pmatrix} su \\ sv \\ s \end{pmatrix} + \begin{pmatrix} D_x \\ D_y \\ D_z \end{pmatrix} \tag{1}$$

The matrix M is then standardized by Toscani's method ("System of calibration and perception of movement in artificial vision," G. Toscani, doctoral thesis, Université de Paris Sud, Orsay, 1987) and one deduces therefrom:

$$\begin{cases} u' = \dfrac{s}{s + D_z} u + \dfrac{D_x}{s + D_x} \\ v' = \dfrac{s}{s + D_z} v + \dfrac{D_y}{s + D_z} \end{cases} \tag{2}$$

This equation makes possible an interpretation of translation D. $D_x$ and $D_y$ produce a translation of the initial image, while the term $D_z$ creates a zoom. This homothety is centered on the upper left-hand corner of the image and is accompanied then by a translation of structures in the image. The dependence on parameters can be detrimental to optimization.

If, now, we have a translation (du, dv) parallel to the image plane associated with a magnification relative to the center of the image ($U_C$, $v_C$), we obtain:

$$\begin{cases} u' = Gu + Gdu + (1 - G)u_c \\ v' = Gv + Gdv + (1 - G)v_c \end{cases} \tag{3}$$

Those parameters are independent and lend themselves well to optimization of the correlation thanks to the fact that they are more intuitive. They are not, however, equivalent to the vector D. In fact, s depends on the coordinates X, Y and Z of point P. We therefore considered that s was constant throughout the volume, which means considering that this volume is punctual. It can be estimated that reconstruction of the 3DXA volume occupies a sphere, for example, 15 cm in diameter, situated midway between the focal point and the image plane, the focal distance of which is, for example, in the order of one meter. The approximation is sufficient, for the matrices obtained indicate that the variation of s is in the order of 1%. The hypothesis is therefore valid and the two equations above are identified in order to determine a bijection between the vector D and the triplet (du, dv G).

The procedure of optimization of these three parameters is as follows:

exhaustive low-resolution search, for example, 64×64 pixels. The limits of variation of the parameters are either set by the angiography machine or respond to a broad criterion, which is that the two images overlap over at least one-quarter of the surface;

maximum resolution search, which consists of an exhaustive search along the axes of the mark of space of the parameters. Only one parameter at a time is modified to generate the search space. In the case of three parameters, we therefore have only six correlation calculations instead of 26 to be made. It is to be noted, finally, that, parameter G being very different from du and dv in amplitude and influence, we alternate between its optimization and the common optimization of du and dv. The parameters acting in the axial plane (with high resolution) and those exerting their influence in the orthogonal direction (with lower resolution) are thus distinguished.

The parameters du, dv and G, which maximize the correlation between the DSA image and the MIP image, being found, the projection matrix M is modified accordingly and the 3DXA volume is projected to generate a new MIP image. That new image is close enough to the DSA to be able to lend itself to an optical flux calculation. The difference between the MIP image and the DSA image is explained by an error on the position of the 3DXA volume in the mark of the camera. This error is akin to a slight rigid displacement.

Let us consider a point P=(X, Y, Z) in space at time t and point P'=(X', Y', Z') reached at time t' from P by a slight rigid displacement, consisting of rotation R=$R_A R_B R_C$ (A, B and C being the angles of rotation around the base vectors of the three-dimensional mark) and translation T=(U, V, W). We then have:

$$P'=RP+T$$

In this hypothesis where the movement is slight, we have:

$$P'-P=P=\Omega XP+T \text{ with} \Omega=(A, B, C)$$

In the internal mark of the camera, point P is projected on the pixel of coordinate (u, v) of the image according to the formulas:

$$u = \alpha \frac{X}{Z} \quad \text{and} \quad v = \alpha \frac{Y}{Z}$$

where α is the ratio of the focal distance to pixel size for the camera. By deriving that equation in relation to time and combining it with the previous one, we obtain:

$$\begin{cases} \dot{u} = \alpha B - Cv - \frac{A}{\alpha}uv + \frac{B}{\alpha}u^2 + \frac{\alpha U - Wu}{Z} \\ \dot{v} = -\alpha A + Cu + \frac{B}{\alpha}uv - \frac{A}{\alpha}v^2 + \frac{\alpha V - Wv}{Z} \end{cases} \quad (6)$$

This equation corresponds almost to a transformation in the image plane, except for the term in 1/Z. This is the problem raised by resolution of the three-dimensional movement from the apparent movement of the equation defining P'–P. Only five parameters out of the six can be resolved, for an uncertainty remains as to the depth of the object in the field given by the variable Z. An object in translation parallel to the image plane will generate the same apparent movement as an object twice as small, situated twice as close to the optical center and driven by a movement parallel to the first, but twice as weak. We can, however, take advantage of the projection of MIP type. In fact, that projection joins a single voxel to each pixel. For each pixel, on calculation of the MIP projection, we can, consequently, join the depth of the voxel chosen as value of Z. The equation determining the derivatives of u and v then completely links the coordinates of the pixels in the image to the six parameters of the movement sought.

The values of u and v for each pixel remain to be determined. According to the hypothesis of optical flux, the intensity of the object between the DSA image and the MIP image is constant. That is not absolutely observed, in the sense that the two images are obtained by different means and do not represent exactly the same objects, a real object in one case and a tomographic reconstruction in the other. Following this idea, however, one writes:

$$\frac{dI}{dt} = \vec{\nabla}I \cdot \begin{pmatrix} \dot{u} \\ \dot{v} \end{pmatrix} + \dot{I} = 0 \quad (7)$$

By combining that equation with the previous equation, we obtain for each pixel two equations that must respect the six parameters of the movement. We then arrive at a system widely overdetermined with six unknowns, which are resolved to the least squares by determination of the pseudo-inverse.

The two phases explained above are based on a large number of MIP projections of the volume. This is evident in the correlation optimization procedure.

In the case of the modified optical flux, the results are qualitatively good, but quantitatively bad, the amplitude of the movement being very much-underestimated, even though its direction may be correct. An iterative resolution of the slight residual movement is then used, which requires a number of MIP type projections, namely, one per iteration.

Now, the generation of a conical MIP type projection of a 3DXA volume takes in the order of one second. For example, in case the low-resolution image is of size 64*64, the number of projections required on exhaustive calculation of the low-resolution correlation is the product of the number of values of parameters du, dv and G, respectively equal to 32, 32 and 35. Therefore, 35840 correlation calculations must be made and, consequently, just as many MIP type projections. At the rate of one second per projection calculation, the duration becomes excessive.

However, the equation defining u' and v' and that defining u and v each define a transformation in the image plane, if we know the parameters of the associated movement (du, dv and G for the correlation; A, B, C, U, V and W for the optical flux). Thus, considering a movement of translation or slight rigid displacement, we can calculate the new MIP image from the old one, without going through a reprojection of the 3DXA volume. The calculation time is considerably improved.

In the case of modified optical flux, the transformation in the image plane cannot be reversed because of the term in 1/Z. It follows that the images undergo an artifact. The degraded zones, that is, the pixels not reached by the transformation, can, however, be localized and they can be avoided in establishment of the system of equations.

The invention therefore makes possible an entirely automatic registration between the DSA image and the 3DSXA volume. A test on an UltraSparc® station rated at 200 MHz was carried out in 1.5 minutes. The reference registration can be given by using a stereotaxic frame. Considering two DSA images taken roughly perpendicular and registered with a 3DXA volume, particular structures can be targeted, such as branches of arteries, pronounced curves, etc., in order to reconstruct the position of the cursor so defined in the 3DXA volume.

In other words, the registration of DSA images with volume images of blood vessels is carried out by calibration of the angiography machine or by use of markers, reduction of the initial error by estimate of a three-dimensional translation, by maximization of the correlation between the DSA image and the conical projection image of the volume, MIP, for example, and use of a modified optical flux technique to refine the registration.

It is therefore possible to precisely locate a catheter in a 3DXA volume, to visualize a blood flow in the 3DXA volume, to estimate the patient's movement in relation to the angiography machine during an image acquisition and to eliminate use of the stereotaxic frame on treatment of a patient. It is also possible to avoid the use of presegmentation of images, which is difficult to carry out and consumes large calculation capacities and requires a manual stage of verification of results by the user. Furthermore, segmentation disrupts the results of registration because of errors, superpositions of arteries in the DSA image, bifurcations, tangencies of arteries, etc., and which can then be detrimental to precision. A high degree of precision is attained by using variables calculated from the base data of the image.

Various modifications in structure and/or steps and/or function may be made by one skilled in the art without departing from the scope of the invention.

What is claimed is:

1. A method of automatic registration of two- and three-dimensional angiography images by comparison of a two-dimensional digital subtracted angiography image with data on a three-dimensional image reconstructed from rotational angiography sequences, in which a field of distortions in at least one of the two-dimensional image and the three-dimensional image is estimated, a conical projection matrix is estimated and an approximation is made of a rigid transformation in space equal to the difference between an initial registration based on the field of distortions and on the conical projection matrix and a perfect registration, the rigid transformation comprising a translation part and a rotation part, an approximation is made of the translation part by considering the rotation part as known, the optimal transformation being attained when the correlation of the digital subtracted angiography image and the reconstructed three-dimensional image data is at a maximum.

2. The method according to claim 1, in which it is assumed that the residual registration error is due to a positioning error on translation and on rotation of the reconstructed three-dimensional image in the mark of an imaging means.

3. The method according to claim 2, in which the difference between the data on the reconstructed three-dimensional image and the two-dimensional digital subtracted angiography image is considered due to a slight displacement following a rigid transformation, and the rigid transformation is determined by a modified optical flux technique.

4. The method according to claim 1 in which the data on the reconstructed three-dimensional image comprises a two-dimensional image obtained by conical projection of maximum intensity or by addition of the values of voxels of the three-dimensional reconstructed image.

5. The method according to claim 2 in which the data on the reconstructed three-dimensional image comprises a two-dimensional image obtained by conical projection of maximum intensity or by addition of the values of voxels of the three-dimensional reconstructed image.

6. The method according to claim 3 in which the data on the reconstructed three-dimensional image comprises a two-dimensional image obtained by conical projection of maximum intensity or by addition of the values of voxels of the three-dimensional reconstructed image.

7. The method according to claim 4, in which, on each displacement of the digital subtracted angiography image, the new two-dimensional image is calculated from the old two-dimensional image, without any new calculation of projection of the reconstructed three-dimensional image.

8. The method according to claim 5, in which, on each displacement of the digital subtracted angiography image, the new two-dimensional image is calculated from the old two-dimensional image, without any new calculation of projection of the reconstructed three-dimensional image.

9. The method according to claim 6, in which on each displacement of the digital subtracted angiographiy image, the new two-dimensional image is calculated from the old two-dimensional image, without any new calculation of projection of the reconstructed three-dimensional image.

10. The method according to claim 1 in which the initial registration is given by a marker unit of known three-dimensional position.

11. The method according to claim 2 in which the initial registration is given by a marker unit of known three-dimensional position.

12. The method according to claim 3 in which the initial registration is given by a marker unit of known three-dimensional position.

13. The method according to claim 4 in which the initial registration is given by a marker unit of known three-dimensional position.

14. The method according to claim 7 in which the initial registration is given by a marker unit of known three-dimensional position.

15. The method according to claim 1 in which the initial registration is given by calibration of the angiography machine.

16. The method according to claim 2 in which the initial registration is given by calibration of the angiography machine.

17. The method according to claim 3 in which the initial registration is given by calibration of the angiography machine.

18. The method according to claim 4 in which the initial registration is given by calibration of the angiography machine.

19. The method according to claim 7 in which the initial registration is given by calibration of the angiography machine.

* * * * *

UNITED STATES PATENT AND TRADEMARK OFFICE
CERTIFICATE OF CORRECTION

PATENT NO. : 6,714,668 B1  
APPLICATION NO. : 09/651035  
DATED : March 30, 2004  
INVENTOR(S) : Kerrien et al.

Page 1 of 1

It is certified that error appears in the above-identified patent and that said Letters Patent is hereby corrected as shown below:

On Title Page,  
Item (56) Other Publications, after "Subtracted", delete "AnGiography" and insert therefor –Angiography--.

Column 3,  
Line 47, after "a", delete ",".

Column 4,  
Line 17 (Formula), delete "s + $D_x$" and insert therefor --s + $D_z$--.  
Line 32, after "image", delete "($U_c$ $v_c$)", and insert therefor --($U_c$ $V_c$)--.

Column 6,  
Line 19, after "very", delete "much-underestimated" and insert therefor –much underestimated--.

Column 8,  
Line 18, after "which", insert therefor --,--.  
Line 19, after "subtracted", delete "angiographiy" and insert therefor –angiography--.

Signed and Sealed this

Twenty-ninth Day of August, 2006

JON W. DUDAS  
*Director of the United States Patent and Trademark Office*